United States Patent [19]

Ratzlaff

[11] Patent Number: 4,524,574
[45] Date of Patent: Jun. 25, 1985

[54] UNDERFED CROP BALER HAVING SINGLE ROTARY FEEDER

[75] Inventor: Howard J. Ratzlaff, Hesston, Kans.
[73] Assignee: Hesston Corporation, Hesston, Kans.
[21] Appl. No.: 611,824
[22] Filed: May 18, 1984
[51] Int. Cl.³ .............................................. A01D 39/00
[52] U.S. Cl. ..................................... 56/341; 100/189
[58] Field of Search .......................... 56/341; 100/189

[56] References Cited

U.S. PATENT DOCUMENTS

| | | | |
|---|---|---|---|
| 2,431,828 | 12/1947 | Raney | 56/341 |
| 2,552,888 | 5/1951 | Druetta | 100/189 |
| 2,909,887 | 10/1959 | Claas | 56/341 |
| 3,552,109 | 1/1971 | Murray et al. | 56/343 |
| 3,880,073 | 4/1975 | Eberly et al. | 56/341 |
| 4,118,918 | 10/1978 | White | 56/341 |
| 4,157,643 | 6/1979 | White | 56/341 |
| 4,184,312 | 1/1980 | Oosterling et al. | 56/341 |
| 4,275,550 | 6/1981 | Swenson et al. | 56/341 |
| 4,372,104 | 2/1983 | Simons et al. | 56/341 |
| 4,375,786 | 3/1983 | Oosterling et al. | 100/189 |

OTHER PUBLICATIONS

Sales Brochure, Hesston Big Bale System, Copyright 1978, BB-1-878.
Vicon Sales Brochure, "Our Grosses Balles".

Primary Examiner—Paul J. Hirsch
Attorney, Agent, or Firm—Schmidt, Johnson, Hovey & Williams

[57] ABSTRACT

The baler uses a single rotary feeder to take crop materials from the center-gathering augers of the windrow pickup and to sweep such materials upwardly and rearwardly through a loading duct into the baling chamber via an opening in the bottom of the latter. A single set of side-by-side crop-engaging forks of the feeder rotates through 360 degrees of travel in a complete cycle of revolution that includes movement up into the bale chamber for presenting the crop materials to the plunger as the latter moves rearwardly in its compaction stroke. Such forks pass through clearance slots in the plunger as the latter wipes crop materials off the forks, but then the forks dip down quickly and temporarily out of the bale chamber into clearance positions as a trailing transverse knife on the plunger comes across the inlet opening of the chamber to sever any dangling strands of crop materials. The forks then pop back up into the bale chamber behind the rearwardly moving plunger until sweeping on down around and into the proximity of the center-gathering augers as their cycle of revolution is completed.

8 Claims, 4 Drawing Figures

4,524,574

UNDERFED CROP BALER HAVING SINGLE ROTARY FEEDER

TECHNICAL FIELD

This invention relates to crop balers of the type which are fed with crop materials up through the bottom of the bale chamber instead of through the top or sides as has heretofore been typical, except in certain prior devices.

BACKGROUND

Prior underfed balers have, for the most part, utilized a pair of separate feeder devices for moving crop materials from the discharge point of the crop pickup to the baling chamber itself. For example, in White U.S. Pat. No. 4,157,643 a first rotary device at the mouth end of the loading duct sweeps material into the duct and fills the latter until such time as a second device in the form of a stuffing fork commences its cycle to stuff the charge up into the bottom of the baling chamber.

Similarly, in Swenson et al U.S. Pat. No. 4,275,550, a first rotary device at the lower mouth end of the duct sweeps material into the open mouth and up into the duct where it is thereupon stuffed up into the bale chamber by a second device in the form of a loading fork.

The baler in Murray U.S. Pat. No. 3,552,109 uses a single stuffing fork to take materials from the pickup and lift the same up through the duct into the bottom of the chamber, but in this machine the stuffer is incapable of loading a charge which extends across the full vertical height of the baling chamber. Instead, each cycle of the stuffer simply adds another small wad of material to those already collected in the bale chamber, each wad being considerably smaller than that which is required to fill the entire area of the chamber vertically and horizontally across the front face of the bale forming therein. The crop package which results from this machine is of relatively low density made up of many discrete, independent wads or bundles of crop materials throughout all areas of the package instead of a series of rectangular, dense "flakes" compacted together along the length of the bale and each of which corresponds in height and width to the internal configurations of the bale chamber.

SUMMARY OF THE PRESENT INVENTION

While the balers of the White and Swenson et al patents are each capable of producing hay packages of premium quality, and in the case of the White patent such package may take the form of a large, highly dense bale weighing two thousand pounds or more, the use of two cooperating devices, one downstream from the other, in moving the picked-up crop materials through the loading duct and into the bale chamber is inherently more complicated and more costly than using a single such device to achieve that end. However, it has heretofore been thought that a single feeder could simply not handle the dual functions of both receiving the materials from the pickup and moving them through a long loading duct into the bale chamber.

Accordingly, it is an important object of the present invention to provide an underfed baler capable of making high-quality crop bales and utilizing but a single rotary feeder to deliver successive charges of crop materials from the pickup apparatus to the baling chamber. In carrying out this objective, the present invention contemplates utilizing a single set of essentially radially extending, side-by-side forks on the feeder which rotate through 360 degrees of travel in one complete revolution, sweeping downwardly and rearwardly into the mouth of the duct, upwardly and rearwardly through the same, and up into and forwardly through the bale chamber before returning back down to the mouth of the duct for the next charge. Vertical slots in the rearwardly moving plunger clear the forks as they initially move up into the bale chamber, but then a cam mechanism associated with the forks causes the latter to dip down abruptly out of the chamber as a trailing knife on the plunger comes across the feed opening thereto, whereupon the forks are caused to flip back up into the chamber behind the moving plunger before sweeping down to complete their cycle.

DETAILED DESCRIPTION

Figure 1:
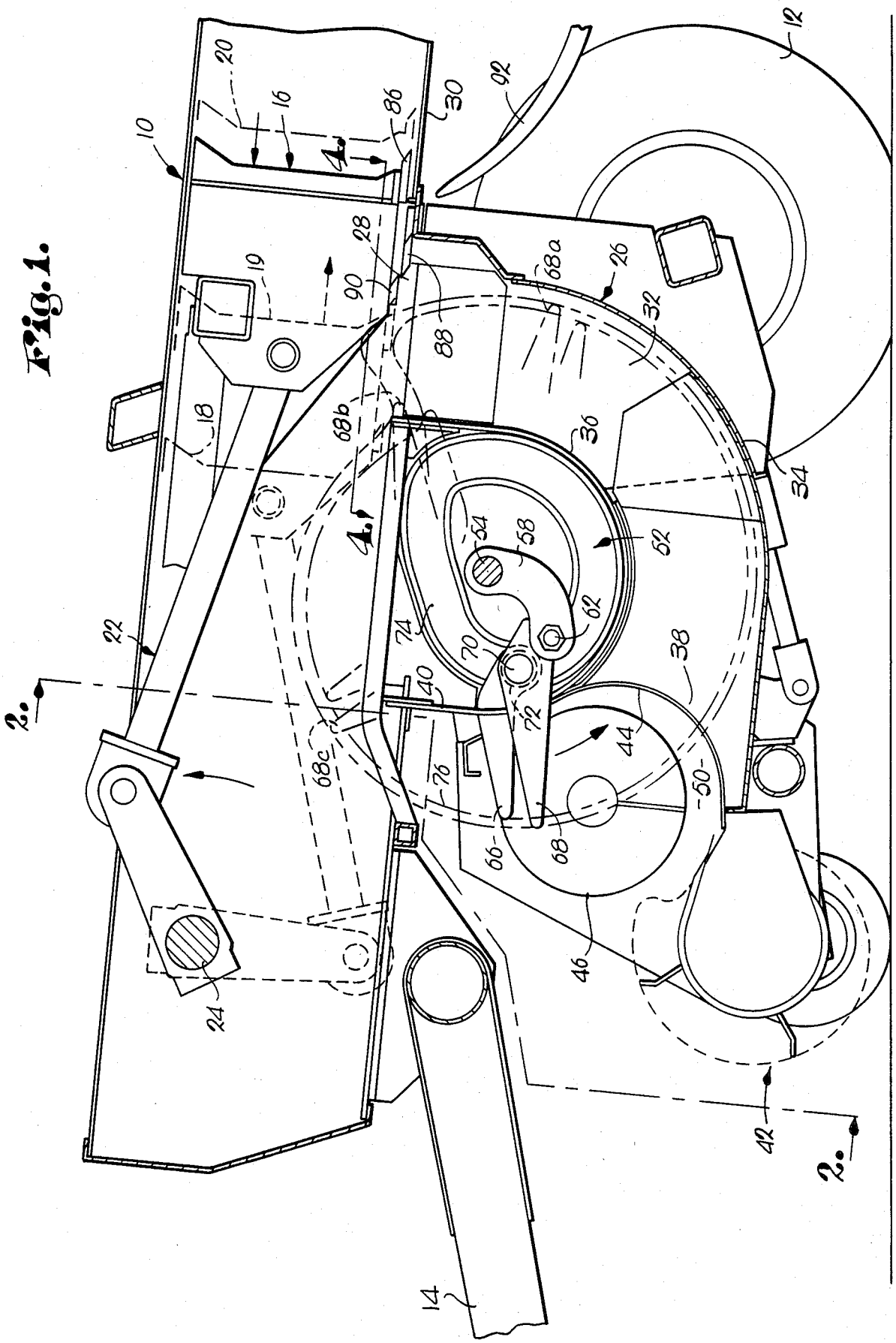
FIG. 1 is a fragmentary side elevational view of a baler constructed in accordance with the principles of the present invention, portions thereof being removed for clarity to reveal details of construction, and various phantom lines being utilized to illustrate operating positions of the cooperating components of the baler.
Figure 4:
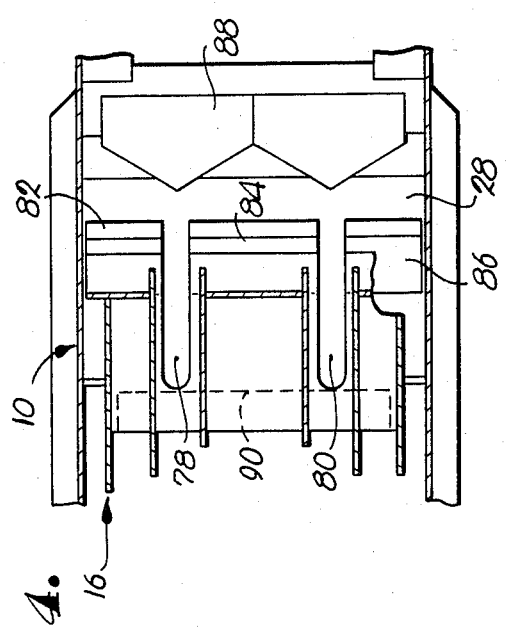
FIG. 4 is a fragmentary, essentially horizontal cross-sectional view through the bottom portion of the plunger when the latter is almost completely covering the opening to the bale chamber as illustrated in the mid-phantom line position in FIG. 1, this view being taken substantially along line 4—4 of FIG. 1.
Figure 3:
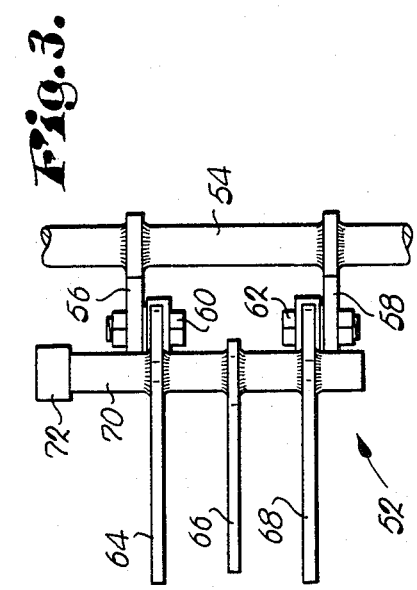
FIG. 3 is a fragmentary plan view of the rotary feeder.

The baler of the present invention includes a long, generally horizontally extending bale chamber 10 of rectangular cross-sectional configuration which is mounted on ground wheels 12 (one only being shown) for advancement along a path of travel as determined by a towing vehicle (not shown) connected to the front end of a tongue 14 which projects forwardly from the bale chamber 10. As is apparent, the chamber 10 has its longitudinal axis lying in a fore-and-aft direction with respect to the normal path of travel of the baler.

A plunger 16 is housed within the chamber 10 for reciprocation in a fore-and-aft direction between a full forward position denoted by the phantom lines 18 and a full rearward position denoted by the phantom lines 20. A pitman and crank assembly 22 pivotally coupled with the plunger 16 and fixed to a main transverse drive shaft 24 across the forward end of the bale chamber 10 is operable to drive the plunger 16 in its reciprocating motion.

The bale chamber 10 is spaced above the ground and has a long, tubular loading duct 26 depending therefrom through which crop materials can be conveyed to the bale chamber 10. The duct 26 is at least as long as the chamber is tall, and preferably is on the order of twice the height of chamber 10. A rectangular opening 28 in the bottom wall or floor 30 of chamber 10 communicates directly with the open upper end of the duct 26 for admitting crop materials into the chamber 10. As illustrated in FIG. 1, the plunger 16 moves back and forth across the opening 28 during its reciprocation.

The duct 26 is generally rectangular in cross section, having a pair of opposite side walls 32 (only one being shown), a curved bottom wall 34, and a curved, slotted top wall 36. The walls 32, 34, and 36 terminate at their forward ends in an open entry mouth 38 which is slightly wider than the bale chamber 10 as a result of a laterally outward flare being imparted to the duct 26 as the mouth 38 thereof is approached. A frontmost wrapper 40 which is slotted in the same manner as the top wall 36 curves upwardly and forwardly from the mouth 38 as a continuation of the top wall 36 to join with the bottom of the bale chamber 10.

Figure 2:
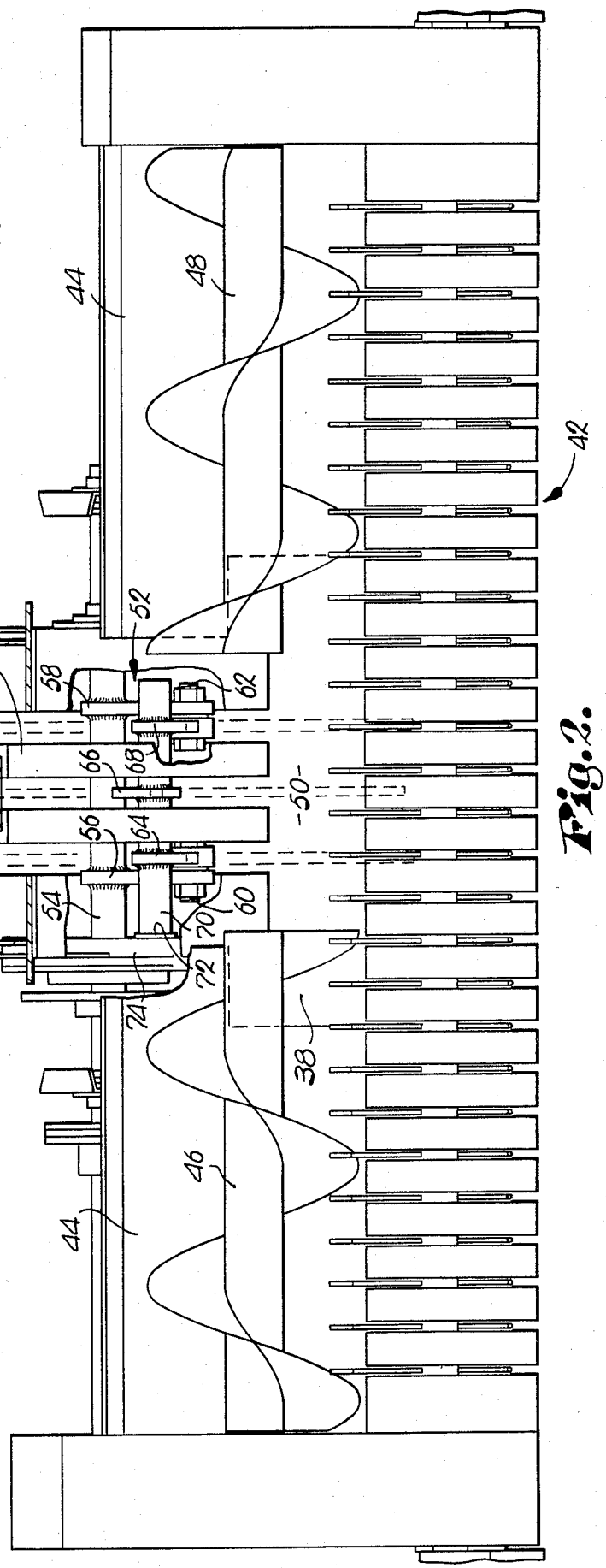
FIG. 2 is a fragmentary transverse cross-sectional view of the baler taken substantially along line 2—2 of FIG. 1.

A crop pickup 42 is spaced forwardly from the mouth 38 generally below the latter and extends transversely outwardly in opposite directions beyond the lateral confines of the duct 26. This is shown for example in FIG. 2 wherein it will be seen that the pickup 42 is substantially wider than the mouth 38 of the duct 26. A pair of transversely extending troughs 44 are disposed immediately rearwardly of the pickup 42 and slightly above the latter which extend inwardly from the opposite lateral extremes of the pickup 42 and terminate at their inner ends adjacent the mouth 38. A pair of separate conveyors in the form of augers 46 and 48 are disposed within the troughs 44 for the purpose of conveying crop materials from the outer, lateral reaches of the pickup 42 into the center of the machine in alignment with the mouth 38. The augers 48 are spaced apart at their innermost ends immediately forwardly of the mouth 38 and define a zone of deposit 50 for the crop materials which have been center-gathered thereby. The pickup 42 and the augers 46, 48 may collectively be thought of in a broad sense as apparatus forwardly of the mouth 38 for pickin up crop materials from the ground as the baler is advanced and for converging such materials to the deposit zone 50 for subsequent entry into the duct 26 through the mouth 38.

A single rotary feeder broadly denoted by the numeral 52 is positioned generally above the duct 26 and below the bale chamber 10 in disposition for taking materials from the zone 50 and sweeping the same up through the duct 26 and into the bale chamber 10 in timed relationship with reciprocation of the plunger 16. Such feeder 52 includes a transverse shaft 54 spanning the bale chamber 10 below the latter and continuously driven about its longitudinal axis during operation of the baler by means not shown but well understood by those skilled in the art. Affixed to the shaft 54 at two spaced-apart locations along the latter are curved cranks 56 and 58 connected at their outer ends by pivotal couplings 60 and 62 to a set of three crop-engaging forks 64, 66, and 68. The forks 64, 66, and 68 are all rigidly attached to a common crossbar 70 having a cam follower 72 at one end thereof riding within a cam track 74 on the corresponding interior sidewall of the baler. The three forks 64, 66, and 68 are disposed to project through the slots in wrapper 40 and the corresponding slots in the top wall 36 of duct 26 during operation, the center fork 66 of the three being set back slightly from the other two forks 64, 68 in a trailing sense and being slightly shorter than such forks 64, 68. As a result of the interaction between the cam follower 72 and the cam track 74, those structures serve as mechanism for causing the forks 64, 66, and 68 to travel along a course of travel denoted generally by the numeral 76 during operation.

The plunger 16 has a pair of vertical slots 78 and 80 passing entirely through the rear portion thereof. Such slots 78, 80 are aligned with the two forks 64 and 68 so as to clear the latter during a portion of the baler operating cycle as will be discussed below. Three short knife sections 82, 84, and 86 are located at the base of the plunger 16 along its rearmost edge on opposite sides of the slots 78, 80 for cooperating with a stationary knife means 88 located along the rear extremity of the opening 28 to the bale chamber 10. A continuous knife 90 extends across the bottom of the plunger 16 at the forward terminations of the slots 78, 80 for likewise cooperating with the stationary knife means 88 during movement of the plunger 16 across the opening 28.

The baler is also provided with appropriate knotter or wire-tying mechanism (not shown) for binding a bale after formation within the chamber 10. It will be appreciated in this respect that such mechanism may include a set of knotting needles 92 which are normally maintained below the bale chamber 10 awaiting periodic actuation, at which time they swing upwardly through the bale chamber 10 and the slots 78, 80 in the plunger 16 as a strand of twine or wire is looped around the formed bale.

OPERATION

As the baler is towed along its path of travel, the plunger 16 reciprocates continuously within the bale chamber 10 back and forth across the opening 28 to pack charges of material introduced from the duct 26 against previously compacted materials disposed rearwardly from the opening 28. In this respect, as will be well understood by those skilled in the art, the baler operates in the nature of an extrusion-type baler in which a rearmost discharge opening of the bale chamber 10 is constricted with respect to portions upstream therefrom so as to induce a resistance to the rearward movement of baled materials through the chamber 10, thereby causing compaction of each new charge of material introduced into the chamber 10 and packed rearwardly by the plunger 16. Although not shown in the drawings, it will also be understood by those skilled in the art that suitable retaining hay dogs or the like are used in connection with the bale chamber 10 for holding a freshly compacted charge of materials against retrograde, forward movement after being pressed rearwardly by the plunger 16 to a position behind the opening 28. Thus, the opening 28 is rendered clear and open for the next introduction of a charge from the duct 26.

Upon being lifted off the ground by the pickup 42, the crop materials encounter the center-gathering augers 46, 48 and are moved inwardly along the troughs 44 until reaching the deposit zone 50 immediately in advance of the entry mouth 38 of the duct 26. Due to forward around travel and momentum of incoming crops, some of those materials move into the mouth 38 and begin to accumulate within the duct 26 itself. There they remain for the short time it takes for the forks 64, 66, and 68 to complete a previous revolution and sweep downwardly through zone 50 and into the mouth 38 along course of travel 76, carrying with them the awaiting collection of materials. By the time the forks 64, 66, and 68 have reached the position indicated by the designation 68a near the top of the duct 26, the plunger 16 will have retracted to its fully-forward position 18, completely uncovering the opening 28 and allowing the charge of crop materials to be swept upwardly into the chamber 10.

The course of travel 76 is such that the forks 64, 66, and 68 actually travel for a short distance up into the chamber 10 as they stuff the charge of materials into the latter and as the plunger 16 commences its compaction stroke in a rearward direction. The rear face of the plunger 16 and the forks 64, 68 cooperate at this time to assure a clean wiping of the crop materials off the forks 64, 68 as the latter pass into the slots 78, 80 and the plunger 16 continues rearwardly toward its full rearward position 20.

Immediately after entering the slots 78, 80, the forks 64, 68, as well as the middle fork 66, are caused by the cam track 74 to dip down abruptly out of the bale chamber 10 to the position as illustrated by the designation 68b. This position of the forks corresponds to position 19 of the rear face of the baler, and it will be noted that such dipping by the forks 66, 66, and 68 is necessary to clear the knife 90 across the trailing end of the plunger 16 with respect to the direction of compression stroke of the latter.

Thereafter, the forks 64, 66, and 68 are caused to flip back up into the chamber 10 into that area vacated by the rearwardly moving plunger 16. The position illustrated by the numeral 68c of the forks 64, 66, and 68 corresponds to the full rearward position 20 of the plunger 16. By the time forks 64, 66, and 68 have completed their 360 degrees of rotation and are once again sweeping back down through the zone 50 between augers 46 and 48, a new volume of material has collected and is ready to be swept through the duct 26 and stuffed up into the chamber 10.

It is important to note that the action of the feeder 52 is not like that of a pitchfork which might be jabbed into the crop materials through the top wall 36 of the duct and then swept upwardly until being withdrawn in a relatively linear manner. This sort of action would result in movement of the feeder along a realtively kidney-shaped path of travel such as illustrated, for example, in the prior U.S. Pat. Nos. 4,157,643; 4,275,550, and 3,552,109 mentioned at the outset. Instead, the forks 64, 66, and 68 turn through a complete 360 degree cycle of revolution, sweeping rearwardly and upwardly through the duct 26 on the loading portion of the cycle, then forwardly through the bale chamber and downwardly to the deposit zone during the return portion of the cycle. By passing downwardly through the centerline of the augers 46, 48, the forks 64, 66, and 68 reach far enough forwardly to be assured of encompassing a full charge of incoming crop materials and sweeping the same smoothly up through the duct and into the bale chamber 10.

I claim:

1. A crop baler comprising:
   a generally horizontally disposed baling chamber extending in a fore-and-aft direction with respect to the path of travel of the baler;
   a plunger mounted for reciprocation within said chamber in said fore-and-aft direction,
   said chamber having an entrance opening in a lower wall thereof over which said plunger passes during said reciprocation;
   a tubular loading duct depending from said chamber with its upper end in direct communication with said opening and having a length which is at least as great as the vertical dimension of said chamber, said duct curving downwardly and forwardly from said opening and terminating in a forwardmost end defining an open, crop-receiving mouth;
   apparatus forwardly of said duct for picking up crop material from the ground as the baler moves along said path of travel and for presenting the picked up material to said mouth; and
   a single rotary feeder operable to load the baling chamber with successive charges of crop materials from said mouth of the duct in timed relation to reciprocation of the plunger,
   said feeder including crop-engaging structure which turns through 360 degrees of revolution along a course leading into said mouth, rearwardly through the duct, up into the baling chamber, and back down to the mouth during each cycle.

2. A crop baler as claimed in claim 1, wherein said apparatus includes conveying means adapted to receive picked up crop materials in locations laterally outboard of the opposite lateral confines of said mouth and to converge the same inwardly to a point aligned fore-and-aft with the mouth, said conveying means including a pair of laterally spaced apart conveyors terminating inwardly adjacent said opposite confines of the mouth to define a deposit zone between the opposed inner ends of the conveyors and immediately in front of the mouth, said course of the feeder structure passing downwardly through said zone before entering the mouth.

3. A crop baler as claimed in claim 2, wherein each of said conveyors comprises an auger.

4. A crop baler as claimed in claim 2, wherein said feeder includes mechanism causing said structure to temporarily dip below said plunger as the latter passes overhead following entry of the structure into the baling chamber and during a compaction stroke of the plunger.

5. A crop baler as claimed in claim 4, wherein said plunger is provided with clearance slots in the bottom and forward portions thereof with respect to the direction of plunger travel during a compaction stroke, said slots having knife means across trailing portions thereof with respect to the direction of plunger travel during a compaction stroke cooperable with stationary means adjacent the inlet opening to sever dangling crop materials during each plunger compaction stroke, said mechanism causing said structure to initially enter said clearance slots as the structure moves up into the bale chamber, then dip down below said knife means to clear the latter before returning up into the bale chamber behind the plunger as the latter completes its compaction stroke.

6. A crop baler as claimed in claim 5, wherein said structure includes a single set of forks disposed at spaced apart locations across the transverse width of said duct, said forks projecting generally radially outwardly from the axis of rotation of the feeder.

7. A crop baler as claimed in claim 6, wherein said mechanism includes a transverse, driven shaft defining said axis of feeder rotation, a crank assembly rigid to said shaft for rotation therewith, means pivotally coupling said set of forks to the outer end of the crank assembly, a stationary cam track, and follower means associated with said forks and movable in said track for causing the forks to move in said course of travel upon rotation of the shaft.

8. A crop baler as claimed in claim 5, wherein said baler is also provided with knotter needles movable periodically through said slots of the plunger.

* * * * *